United States Patent [19]
Brockman et al.

[11] Patent Number: 5,927,025
[45] Date of Patent: Jul. 27, 1999

[54] MECHANICAL RETRACTABLE RAILWAY DOCK SHELTER

[75] Inventors: Thomas R. Brockman, Kenton; Mark Dillon, Upper Sandusky, both of Ohio

[73] Assignee: Fairborn USA Inc., Upper Sandusky, Ohio

[21] Appl. No.: 08/942,112

[22] Filed: Oct. 1, 1997

[51] Int. Cl.⁶ .................................................. E04D 13/18
[52] U.S. Cl. ............................ 52/173.2; 52/2.12; 52/70; 52/71; 160/124; 160/181; 49/504
[58] Field of Search ................................. 52/173.2, 2.12, 52/71, 70; 160/181, 124; 49/504

[56] References Cited

U.S. PATENT DOCUMENTS

| | | |
|---|---|---|
| 3,322,132 | 5/1967 | Rieder et al. . |
| 3,528,086 | 9/1970 | Conger . |
| 3,792,559 | 2/1974 | Frommelt et al. ...................... 52/173 |
| 3,826,049 | 7/1974 | Frommelt et al. ...................... 52/173 |
| 3,915,183 | 10/1975 | Frommelt . |
| 5,185,977 | 2/1993 | Brockman et al. ...................... 52/173 |
| 5,341,613 | 8/1994 | Brockman et al. ...................... 52/173.2 |
| 5,553,424 | 9/1996 | Brockman et al. ...................... 52/2.12 |

*Primary Examiner*—Christopher Kent
*Assistant Examiner*—Yvonne Horton-Richardson
*Attorney, Agent, or Firm*—Birch, Stewart, Kolasch & Birch,LLP

[57] ABSTRACT

The present dock shelter assembly provides, at a given warehouse or building dock, a protective unit that presents a weather-tight seal when extended from the dock against the open sliding door or side of an adjacent rail car. It is desirable that such a dock shelter not only permit complete and unobstructed rail car access, but also provide outstanding weather protection. The shelter herein is mounted along the outer perimeter of the dock opening of the terminal building and permits free access to the rail car whereupon its gap closure may be protected upon its sides and bottom during loading and unloading. The car is also sealed by a head curtain above the shelter components. The unit is sufficiently versatile to accommodate a rail car which may be somewhat out of position, relative to a dock center as defined by the building construction. Likewise, the shelter protection should continue its effectiveness despite rocking motions of the car when loaded and unloaded. These objectives are achieved through a rear frame adjustable chain/rope combination which is movable against lefthand and righthand spring-loaded cross-bar side frame assemblies that may retract and extend rear and front frames, relative to a rail car which is temporarily positioned adjacent the warehouse dock.

8 Claims, 4 Drawing Sheets

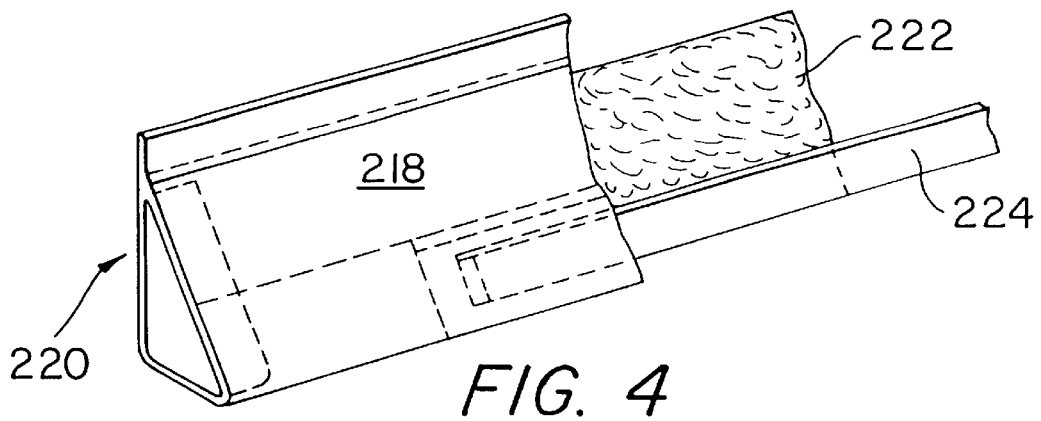
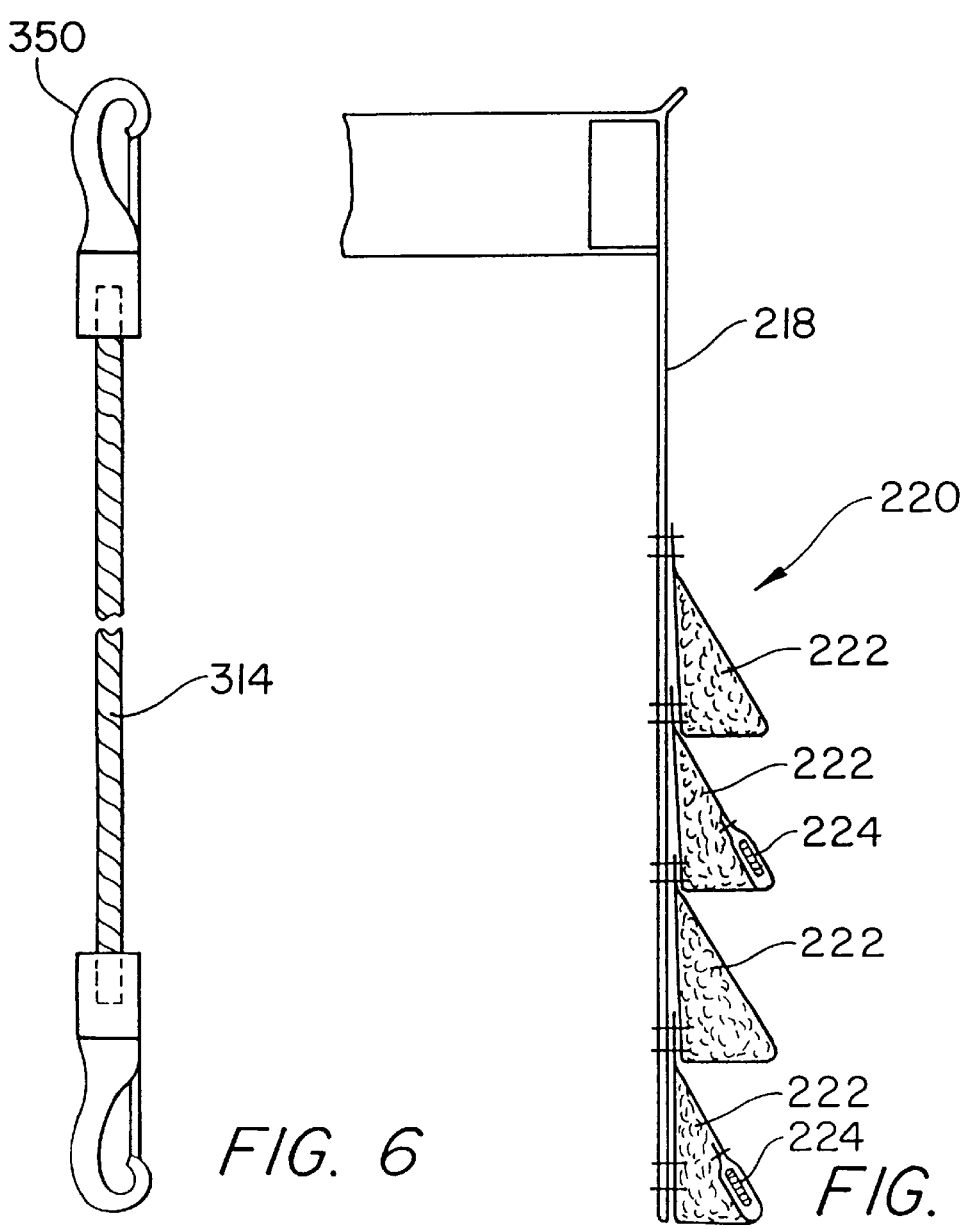

MECHANICAL RETRACTABLE RAILWAY DOCK SHELTER

CROSS REFERENCE TO RELATED APPLICATIONS

NONE

BACKGROUND OF THE INVENTION

In the loading and off-loading of railway cargo cars, it is desirable to seal the area between terminal dock and/or shelter against inclement weather. Accordingly, the present invention is adapted to provide at a given warehouse or building dock, a protective unit that presents a weather-tight seal when extended from the dock against the open sliding door or side of the car. It is desirable that such a dock shelter not only permit complete and unobstructed rail car access, but also provide outstanding weather protection. The shelter herein is mounted along the outer perimeter of the dock opening of the terminal building warehouse. It is imperative that such a shelter permit free access to the rail car and that its gap closure be protected upon its sides and bottom during loading and unloading. The car should also be sealed by a head curtain above the shelter components. More specifically, the invention is a rail shelter which may be fitted to existing exterior dock walls for loading and off-loading. The unit is sufficiently versatile to accommodate a rail car which may be somewhat out of position, relative to a dock center as defined by the building construction. The dock center is conventionally determined by door jambs which are operatively disposed, defining the door opening of the building. Likewise, the shelter protection should continue its effectiveness despite rocking motions of the car when loaded and unloaded.

DISCUSSION OF THE PRIOR ART

There follows a listing of the patented art as it relates to the side curtain assembly for dock gap closure of this invention:

Frommelt Oct. 28, 1975 U.S. Pat. No. 3,915,183
  Entitled: Loading Dock Shelters
Brockman et al. Feb. 16, 1993 U.S. Pat. No. 5,185,977
  Entitled: Storage Terminal Shelter, Including Side Curtain Assembly for Truck/Trailer Hinge Gap Closure
Brockman et al. Feb. 1, 1994 U.S. Pat. No. 5,282,342
  Entitled: Storage Terminal Shelter, Including Head Pad and Side Pad Assemblies for Truck Closure at Docking Stations In none of the aforecited patents is the combination of applicants' rail shelter with side frame and cross-bar assembly, with winch units for overall shelter projection and retraction shown or described. The following description, drawings and claims define the distinctive coactive relationship of key elements of the invention.

SUMMARY OF THE INVENTION

Every time a warehouse loading door is opened to gain access to a rail car, there is a transfer of inside and outside air that causes building energy loss. With an open, unsealed 8'×8' loading door, this may currently cost some thousands of dollars a year per door in heating energy loss and in excess of a thousand dollars a year per door in air conditioning energy loss. The present dock shelter units are retrofitted to existing exterior door perimeters to present an effective barrier between the two environments, while permitting materials handling personnel unobstructed access to the rail car and its contents.

This is a loading dock shelter with extensible-retractable closure elements having raked front and rear head frames and winches for left and right side frames, providing shelter projection and retraction to and from a loading dock, thereby forming a protective weather seal.

To facilitate the basic functions of this shelter unit, tension straps are retained beneath the top panel thus serving to maintain a sloped profile. Manual rope winch units having simultaneous motion are provided with removable handles to extend and retract. Likewise, there are deck block style pulleys for rope control with fabric pinch guards. The head curtain assembly is pleated with foam reinforced pleats, the pleats likewise having strap magnets, to seal the shelter against the rail car. Side to side motion of the rail car during loading and/or unloading is compensated by adjustable spring tension and non-binding framework slide mechanisms. A fabric blow-out panel and wrap are disposed at the lower extreme of the shelter to decrease air infiltration below the rail car.

BRIEF DESCRIPTION OF THE DRAWINGS

FIG. 2A is a partial top plan view of the FIG. 2 side frame assemblage.

FIG. 4 is an enlarged, partial and vertical section view of one side frame, curtain pleat according to the invention.

FIG. 5 is a vertical section view of the head frame cover shown in FIG. 3.

FIG. 6 is a plan view of an elastic shock cord used to coast with the top fabric cover in contracted and extended modes and as a front support for the bottom blow-out fabric panel.

DESCRIPTION OF PREFERRED EMBODIMENTS

Figure 1:
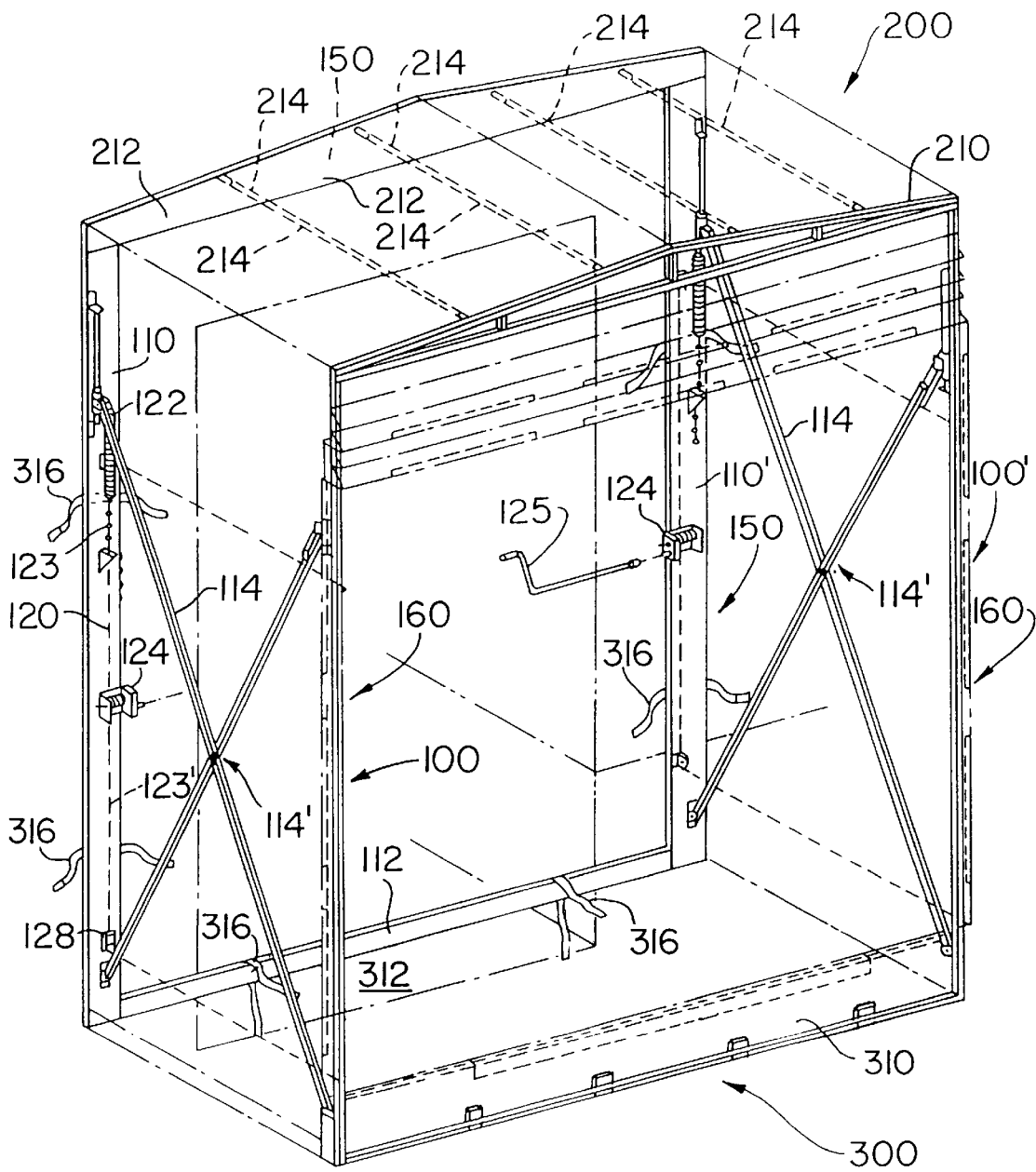
FIG. 1 is a view in perspective of the present dock shelter in extension made with retractable rail car engaging elements. The sketch is a schematic, lacking the weatherproof coverings.

A conventional rail terminal building usually defines multiple doors on its walls. The building dock doors, as in this setting, may have no side frames and the door openings may simply comprise a loading-unloading cavity in the wall; thus, to accommodate the loading and unloading of rail cars, it is desirable to provide extensible-retractable perimeter frames, an associated fabric cover and a blow-out bottom fabric panel.

The storage terminal retractable railway dock shelter of the present invention includes the following assemblies: twin side frames 110-110' mounted for extension/retraction as parts of a fixed rear frame 150 which is opposite a moveable front frame, both front and rear frames having a shelter covering 400 draped thereover. See FIGS. 1 and 3. A front head frame 210 is mounted atop the front side frames 160, as shown, and there is a front bottom frame 310 having right and left connection to the shelter unit.

Figure 2:
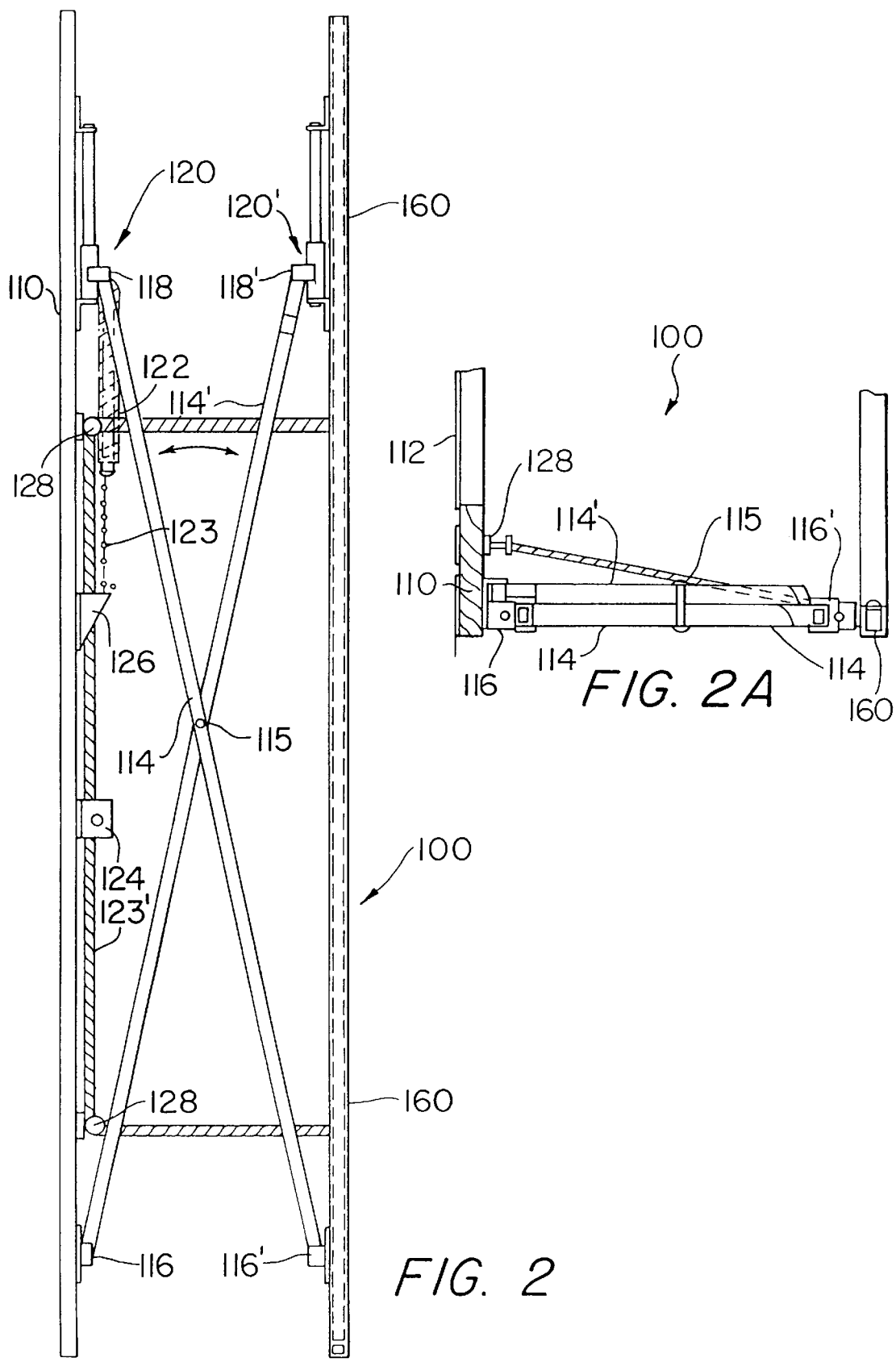
FIG. 2 is a vertical side view of one side frame assembly, depicting the operative relationship between front and rear shelter frames, extended mode.

Referring, initially to the FIG. 1 side frames 100-100', they are mirror image counterparts, each having a mirror rear side frame element 110-110' with a joined rear bottom frame 112. Crossbars 114-114' are secured by pivot brackets 116 to the inside of the frame and have connection on the outside with the forwardmost side frame front crossbar 114', each having pivot brackets 116-116' at the bottom and at their respective top portions, connection with the slide brackets 120-120', there being a slide shaft and angle bracket 118-118' secured to the rear and front frame elements 110, 160. Parenthetically, the crossbar 114' is adapted to ride in a counterpart slide shaft upon the slide bracket 120', lodged in the front of the side frame, this particular crossbar being offset relative to its pivoted counterpart crossbar 114. Double extension springs 122 are retained in side-by-side attachment to the slide bracket 120 and an eyebolt, not shown. Spring tension adjustment chain 123 extends from the bottom of respective springs 122 downwardly to an appropriate bracket 126. Ropes 123' have reel connections with the winch 124 and its associated removable extension handle 125. As an alternative, the winch may be motor activated by battery or other energy source. Thence the ropes 123' extend downwardly and upwardly through pulleys 128 and laterally forward to the front side frame 160. A clevis pin 115, not shown, with appropriate flatwasher and split cotter pin serves to unite the respective crossbars 114-114' in collapsible relation. As indicated in FIG. 1, the shelter is depicted in its extended mode, FIGS. 1 and 2, the adjustment extension springs 122 having been tensioned downwardly.

The head frame 200 defines sloped front and rear frame elements which elevate the center thereof above the horizontal of the front frames 160 and the corresponding rear frame 150. The rear frame 150 is treated wood, providing interconnection between the side frame anchors and being tension connected with the front of the head frame by means of tension straps 214.

The head frame 200 shown in FIG. 1 comprises the sloped front 210 rigidity and slope being preserved by the supports between the horizontal base and inclined top frame members. The rear of the head frame 150 has proximity with the side frame rear elements 110-110' and is adapted to fixation above the dock door, as indicated. Connecting the front 210 and rear 150 are plural tension straps 214, pocket fixed at 214', see FIG. 3. Appropriate screw eyes for the hooks of the plural tension straps 214 are set within the rear 150 of the head frame and similar anchors are fixed to the head frame front 210. The shock cords 214 are preferably approximately ⁵⁄₁₆" in diameter, terminated on each end with plastic clevis snaps 350. See FIG. 6. The straps have a preferred length, maintaining tension while allowing the extended limit of movement of the shelter elements from the building forward so as to engage the rail car itself. A shock cord 314 similar to the straps is applied between the front side frames, through the blow-out bottom panel. See FIG. 3. The base head curtain 218 is to be sewn integral with side and top curtains, hereinafter defined. At the forwardmost segment of the base head curtain 218 are plural pleats 220. The pleats 220 encase plastic foam 222 each defining as part of its assembly a foam pad which is triangular in cross-section, flexible strip magnets 224 being sewn into pockets of alternate pads. See FIG. 5. The function of the magnets is such that strip magnets will cause the assembled insulating pleats to clamp to the rail car being serviced. The flexible strip magnets 224 are thus sewn into pockets at the first and third tiers of the head curtain, as shown in FIG. 5. Left and right side frames 100-100' each contain similar pleats 230 which are disposed vertically from top to bottom of the shelter. Each of these pleats 230 having sewn into side curtain at the front edge a similarly configured and encased foam with flat magnets sewn into curtain front edges of both head frame and side frames. See FIGS. 3 and 4.

Figure 3:
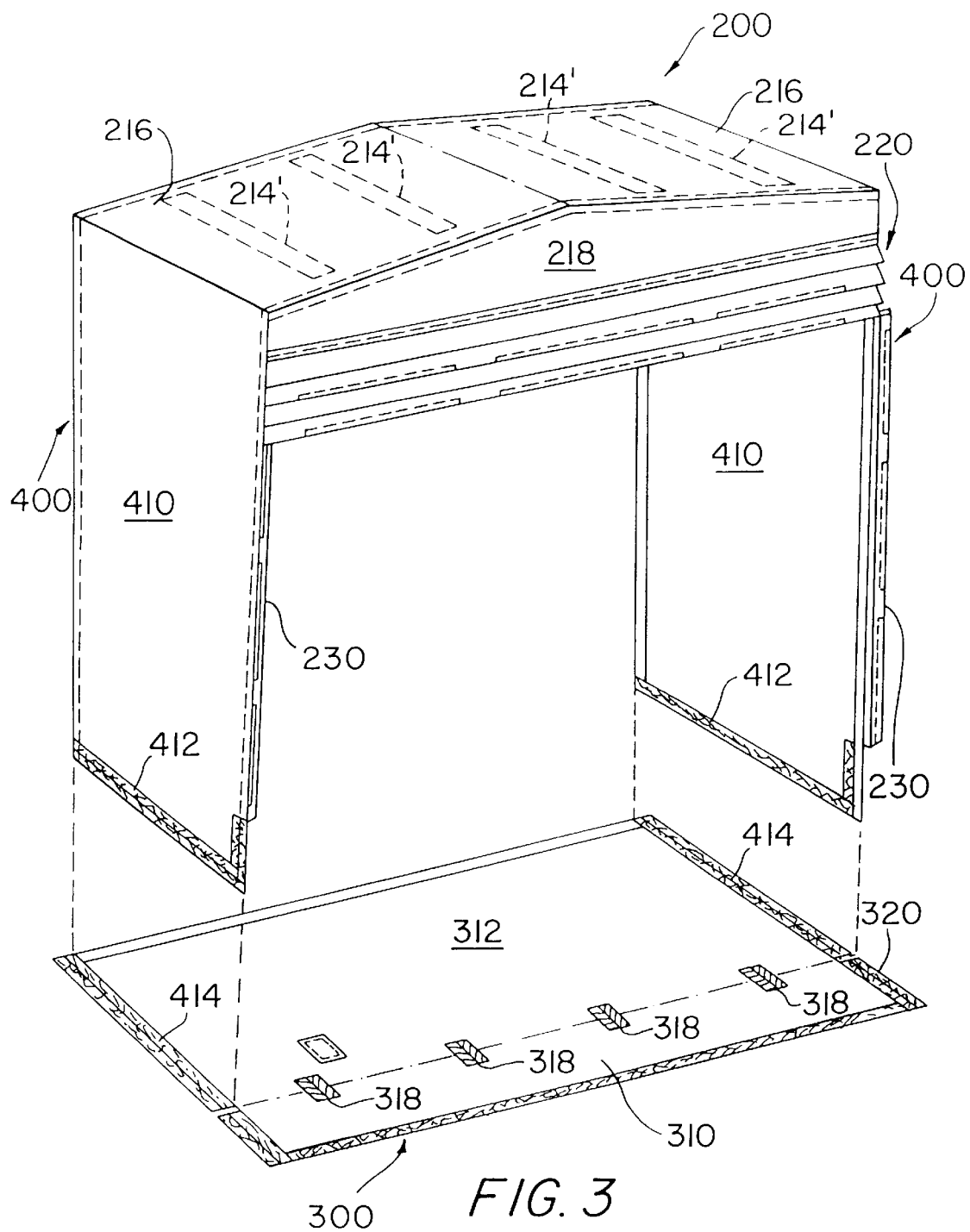
FIG. 3 is a schematic, depicting the fabric coverings for the shelter assembly of FIG. 1.

A bottom frame blow-out mat 312 has a vertical front 310 and a flexible, horizontal bottom 312, both being VEL-CRO® attached to the shelter covering 400, see FIGS. 1 and 3. Additionally, there are fabric tie-back straps with VEL-CRO® 316, these being useful in retaining the unit into its contracted position by means of tension ropes 123'. Fabric VELCRO® strips 318 sewn to the bottom blow-out panel 312 and mating VELCRO® fabric strips 318' are used to secure the bottom blow-out panel 312 to the front, bottom, metal frame. The bottom panel 312 is bordered at sides with VELCRO® strips 320, 414 which are adapted to connect with the exterior bottom and lower front edges 412 of the side frame panels 410, likewise, with respect to the head frame 200 fabric shock cord pockets 214' are secured to the bottom of the roof element.

Referring to FIG. 3, the shelter coverings 400 drape respective conjoint frames with its weatherproof fabric cover. The side frame drapes 410 secure a VELCRO® hook strip in the bottom and lower front edges 412 to lock onto comparable loop strips 320 and 414 at side edges of the blow-out bottom panel. The head and side curtains form an integral drape.

The scope of invention is thus defined in the following claims, wherein:

We claim:

1. A retractable railway dock shelter for loading and unloading rail cars at storage terminals comprising in combination:

a) opposed pairs of side frames (100-100') adapted to be mounted upon a dock and including a tension spring, charged in the extended mode, said side frames including: a fixed rear frame (110,100'), a retractable forward frame (160) mounted upon the rear frame for extension and retraction, relative to crossbars (114-114') each being pivoted at ends of the crossbars to rear and front frames (110-160) of the shelter, connected extension means (122) mounted to the rear frame, applying pressure to extend the crossbars forward; an attached rope (123') for each of the assembled crossbars, extending from rear to front of the side frames and a winch (124) engaged by ropes (123') through deck pulleys with fabric pinch guards (128) to selectively project and retract the shelter against a rail car;

b) a head frame (200) moveable consonant with the side frames (100,100') with a fixed rear horizontal (150) and moveable front horizontal (210), tension straps (214) extending between rear and front horizontals of the frame (200);

c) a bottom frame (300) including a moveable front upright (310) and fixed rear horizontal (112), shock cord (314) extending between left and right uprights of the shelter;

d) shelter coverings engaging fixed and moveable frames (100), (200), (300) including a flexible curtain (410) overhanging the side frame (100), an integral head frame overhead covering (216), a further integral curtain forward head curtain (218), a blow-out bottom panel (312) detachable secured to a lowermost portion of the flexible side curtains, spanning a gap between the side panel curtains (410), pocket means in the bottom panel to retain the shock cord (314) extending from left to right of the bottom of the shelter.

2. The retractable railway dock shelter of claim 1 including an adjustable tension chain (123), said chain connecting at the upper end to at least one compression spring (122) and removably attached at the other end to a fixed anchor, said assembly applying extension tension thereto.

3. The retractable railway dock shelter of claim 2 wherein the rope winch units (124) include removable cranks (125) for simultaneous shelter projection and retraction.

4. The retractable railway dock shelter of claim 3 wherein the cover head curtain (218) includes horizontally extending reinforced pleats (220) containing foam pad inserts (222) and at least one of which contains a magnet (224).

5. A retractable dock shelter for a storage terminal comprising in combination:
   a. opposed pairs of side frames (100-100') adapted to be mounted upon a dock and including a tension spring, charged in the extended mode, said side frames including: a fixed rear frame (110,100'), a retractable forward frame (160) mounted upon the rear frame for extension and retraction, relative to crossbars (114-114') each being pivoted at ends of the crossbars to rear and front frames (110-160) of the shelter, connected extension means (122) mounted to the rear frame, applying pressure to extend the crossbars forward; an attached rope (123') for each of the assembled crossbars, extending from rear to front of the side frames and a winch (124) engaged by ropes (123') through deck pulleys with fabric pinch guards (128) to selectively project and retract the shelter;
   b. a head frame (200) moveable consonant with the side frames (100,100') with a fixed rear horizontal (150) and moveable front horizontal (210), tension straps (214) extending between rear and front horizontals of the frame (200);
   c. a bottom frame (300) including a moveable front upright (310) and fixed rear horizontal (112), shock cord (314) extending between left and right uprights of the shelter;
   d. shelter coverings engaging fixed and moveable frames (100), (200), (300) including a flexible curtain (410) overhanging the side frame (100), an integral head frame overhead covering (216), a further integral curtain forward head curtain (218), a blow-out bottom panel (312) detachable secured to a lowermost portion of the flexible side curtains, spanning a gap between the side panel curtains (410), pocket means in the bottom panel to retain the shock cord (314) extending from left to right of the bottom of the shelter.

6. The retractable dock shelter according to claim 5, and further including an adjustable tension chain (123), said chain connecting at the upper end to at least one compression spring (122) and removably attached at the other end to a fixed anchor, said assembly applying extension tension thereto.

7. The retractable dock shelter according to claim 6, wherein the rope winch units (124) include removable cranks (125) for simultaneous shelter projection and retraction.

8. The retractable dock shelter according to claim 7, wherein the cover head curtain (218) includes horizontally extending reinforced pleats (220) containing foam pad inserts (222) and at least one of which contains a magnet (224).

* * * * *